United States Patent
Klaren et al.

(10) Patent No.: US 8,706,749 B1
(45) Date of Patent: Apr. 22, 2014

(54) DATA QUERYING METHOD USING INDEXED STRUCTURED DATA STRINGS

(75) Inventors: Damian Klaren, San Diego, CA (US); Tracy Castille, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 13/005,256

(22) Filed: Jan. 12, 2011

(51) Int. Cl.
*G06F 17/30* (2006.01)

(52) U.S. Cl.
USPC .......................... 707/760; 707/805; 715/804

(58) Field of Classification Search
USPC ......... 707/705, 708, 713, 715, 726, 731, 737, 707/739, 755, 756, 760, 765, 766, 767, 769, 707/771, 779, 795, 800, 801, 802, 804, 805, 707/809, 796, 803; 715/780, 781, 804, 826, 715/854, 862
See application file for complete search history.

(56) References Cited

U.S. PATENT DOCUMENTS

| | | | |
|---|---|---|---|
| 6,697,801 B1 | 2/2004 | Eldredge et al. | |
| 6,959,415 B1 | 10/2005 | Soderberg et al. | |
| 7,065,561 B2 | 6/2006 | Fry et al. | |
| 7,720,867 B2 * | 5/2010 | Subramanian et al. | 707/793 |
| 7,805,464 B2 * | 9/2010 | McKee et al. | 707/804 |
| 7,890,503 B2 * | 2/2011 | Murarka et al. | 707/728 |
| 8,429,203 B2 * | 4/2013 | Perez et al. | 707/804 |
| 2004/0001084 A1 * | 1/2004 | Shrinidhi et al. | 345/734 |
| 2007/0078872 A1 | 4/2007 | Cohen | |
| 2007/0214134 A1 | 9/2007 | Haselden et al. | |
| 2007/0260450 A1 | 11/2007 | Sun | |
| 2008/0270345 A1 | 10/2008 | Barlow et al. | |
| 2011/0264665 A1 * | 10/2011 | Mital et al. | 707/741 |
| 2012/0221600 A1 * | 8/2012 | Yan | 707/769 |

* cited by examiner

*Primary Examiner* — Greta Robinson
(74) *Attorney, Agent, or Firm* — SPAWAR Systems Center Pacific; Kyle Eppele; Ryan J. Friedl

(57) ABSTRACT

A method involves identifying, within each of a plurality of structured data strings within a data file having a serialized data format, each of the plurality of structured data strings contained within an atomic element of an atom within the data file, data particles located within substantially the same location within each structured data string and that match a pre-defined regular expression, and generating a plurality of indexed structured data strings by creating, within each of the plurality of structured data strings, a separate index across all of the plurality of structured data strings for each identified data particle matching a particular pre-defined regular expression. The method may be incorporated into a GUI, where the indexed structured data strings may be displayed to a user and the user may then provide feedback. The user feedback may be a data query, resulting in data that was otherwise not readily searchable.

16 Claims, 3 Drawing Sheets

DATA QUERYING METHOD USING INDEXED STRUCTURED DATA STRINGS

FEDERALLY-SPONSORED RESEARCH AND DEVELOPMENT

The Data Querying Method Using Indexed Structured Data Strings is assigned to the United States Government and is available for licensing for commercial purposes. Licensing and technical inquiries may be directed to the Office of Research and Technical Applications, Space and Naval Warfare Systems Center, San Diego, Code 72120, San Diego, Calif., 92152; voice (619) 553-2778; email ssc_pac_T2@navy.mil. Reference Navy Case Number 100490.

BACKGROUND

Some data strings do not contain data in a readily-searchable format. For example, in a common text-based data exchange format, such as XML, a particular data string may contain multiple data that a user would like to query. Such a XML data string does not allow for complex querying of the data items. A need exists for a method that allows for precise querying of data strings that include multiple data subsets.

DETAILED DESCRIPTION OF SOME EMBODIMENTS

Figure 1:
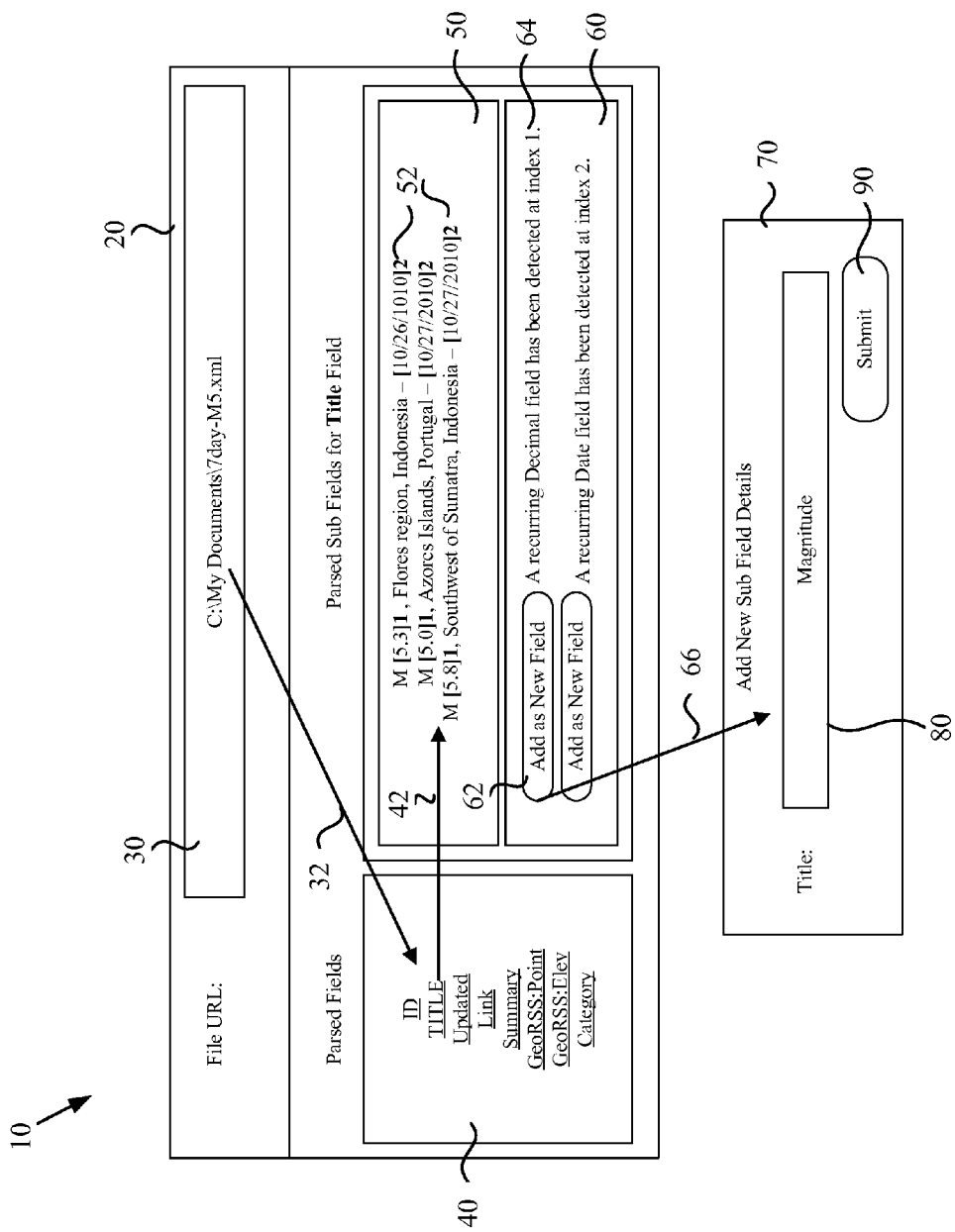
FIG. 1 shows a diagram of an embodiment of a graphical user interface that incorporates a method in accordance with the Data Querying Method Using Indexed Structured Data Strings.

FIG. 1 shows a diagram of an embodiment of a GUI 10 that incorporates the Data Querying Method Using Indexed Structured Data Strings. GUI 10 may be used by a user to quickly query data from a file, such data residing in a format that is otherwise not readily searchable. The operation of GUI 10 will be used to explain method 100 as disclosed herein and discussed with reference to FIG. 2.

GUI 10 includes a first window 20 and a second window 70. First window 20 includes a File Uniform Resource Locator (URL) textbox 30, a Parsed Fields textbox 40, a Parsed Sub-Fields textbox 50, and an Action textbox 60. A user first selects a file to be searched by either browsing for the file or typing the file URL into File URL textbox 30. The selected file must contain a supported serialized data format. The selected file will then appear in File URL textbox 30. As shown, the selected file is an extensible markup language (XML) file containing earthquake data in a GeoRSS format from the United States Geological Service.

Next, the system will search the file and parse out identified fields, as shown by action arrow 32. The parsed fields may also be referred to as data fields. A data field represents one related/logical unit of data in the selected file. For instance, a data field may be one row of an Excel file or an item in an RSS feed. A data field may contain a data set having many data strings that include a variable amount of data items. A data item is actual data. For example, a data item may be a value or another row or column in an Excel file, or sub-item tags in a Really Simple Syndication (RSS) feed.

The data fields will be displayed in Parsed Fields textbox 40. The user may then select a data field to further parse, or sub-parse, according to method 100 disclosed herein. Upon the selection of a data field, Parsed Sub-Fields textbox 50 will be populated as shown by action arrow 42, and Action textbox 60 will be populated accordingly. As shown, the user has selected the data field entitled "Title." The data displayed in Parsed Sub-Fields textbox 50 represents data from each "Title" field found in the data file selected in File URL textbox 30. The entirety of this data is referred to as a data set. Thus, the entirety of the data shown in Parsed Sub-Fields textbox 50 is referred to as the data set of the Title field.

Three rows of data, or data strings, are shown within the Title field data set. It should be noted that many more data strings exist, but only 3 shown for illustrative purposes. Each of data strings may be structured, meaning that certain types of data occur in certain locations throughout the data string. In some embodiments, user feedback may be necessary to identify the exact structure of the data string. Thus, each row of data is referred to as a "structured data string." Further, each structured data string contains multiple data items. For example, in the first structured data string, "5.3" is one data item, "Flores region, Indonesia" is another data item, and "Oct. 26, 2010" is another data item.

Each structured data string in Parsed Sub-Fields textbox 50 contains two bracketed entries, followed by a numeric designation. For example, the first bracketed entry in row 1 is [5.3], followed by the number 1, while the second bracketed entry for row 2 is [Oct. 27, 2010] followed by the number 2. It should be recognized that the first bracketed entries in each of rows 1-3 pertain to the same type of data format—a decimal, while the second bracketed entries in each of rows 1-3 pertain to the same type of data format—a date. Each of the data formats are defined by a "regular expression." The regular expressions are pre-defined prior to the data file being selected, hence, the regular expressions are termed "pre-defined regular expressions." Each of the bracketed entries refer to a data item that matches a pre-defined regular expression. Types of pre-defined regular expressions include, but are not limited to: decimal expressions, integer expressions, date expressions, geo-coordinate expressions, binary expressions, and string expressions.

Further, each of the first bracketed entries are followed by the same numerical designation—a number 1, while each of the second bracketed entries are followed by the same numerical designation—a number 2. The numerical designation is referred to as an "index." It should be recognized by a person having ordinary skill in the art that other index designations, such as alphabetic or alpha-numeric, may be used. Accordingly, the structured data strings as shown in FIG. 1 may be referred to as "indexed structured data strings" 52, as they have data items that have been indexed. A discussion of indexing follows.

Separate data items within each row that have been matched to separate pre-defined regular expressions should contain different indexes. For example, the first matched data item in the first structured data string of textbox 50, "5.3," matches a decimal pre-defined regular expression and has an index of 1, while the second matched data item in the first structured data string of textbox 50, "Oct. 26, 2010," matches a date pre-defined regular expression and has an index of 2.

Separate data items within each row that have been matched to the same pre-defined regular expressions should contain different indexes. In such a scenario, the user may provide feedback via GUI 10 as to whether or not the data items matching the same pre-defined regular expression really should be indexed separately.

If one or more data items that match a particular pre-defined regular expression are located within the same location or substantially the same location within each structured data string, across all structured data strings, each such data particle should have the same index. For example, as shown in FIG. 1, across all of the structured data strings within the data set, each matched data item matching a decimal pre-defined regular expression occurs as the first data item within the structured data string. Each such indexed data item is given an index of 1. In a similar manner, across all of the structured data strings within the data set, each matched data item matching a date pre-defined regular expression occurs as the last data item within the structured data string. Each such indexed data item is given an index of 2.

It should be noted that all of the indexing rules need to be considered before an index designation is assigned. For example, if separate pre-defined regular expressions are matched to separate data items within the same structured data string, but the locations of such data items within the structured data string is not the same or substantially the same as the locations of similarly matching data items in other structured data strings within the same data set, then an index should not be assigned to the matched data items. For example, if, in FIG. 1, the second indexed structured data string 52 contained, as the first data item, a data item matching a date pre-defined regular expression, rather than the decimal pre-defined regular expression as shown, neither index 1 nor index 2 would be assigned to any of the data items within the data set.

Action textbox 60 is populated with information pertaining to the indexing based upon the sub-parsing and indexing performed. In one embodiment, Action textbox 60 includes a description 64 of the each index found in textbox 50, along with a corresponding action button 62 that allows the user to provide user-feedback. As shown, action button 62 allows a user to add either the recurring decimal field detected at index 1 or the recurring date field detected at index 2 as a New Field by selecting the appropriate "Add as New Field" action button 62.

Upon selecting one of the "Add as New Field" buttons action buttons 62, second window 70 is displayed to a user as indicated by action arrow 66. Second window 70 includes a New Sub-Field Details textbox 80 and a Submit button 90. As shown, a user can add a new Title into New Sub-Field Details textbox 80 to give the indexed data item a meaningful identifier. When the user selects submit button 90, a new Title field will be generated. As shown, a new Sub-Field with the title "Magnitude" will be generated, as the user typed the term "Magnitude" into textbox 80. The "Magnitude" sub-field may then be treated as a data field and displayed in Parsed Fields textbox 40.

Figure 2:
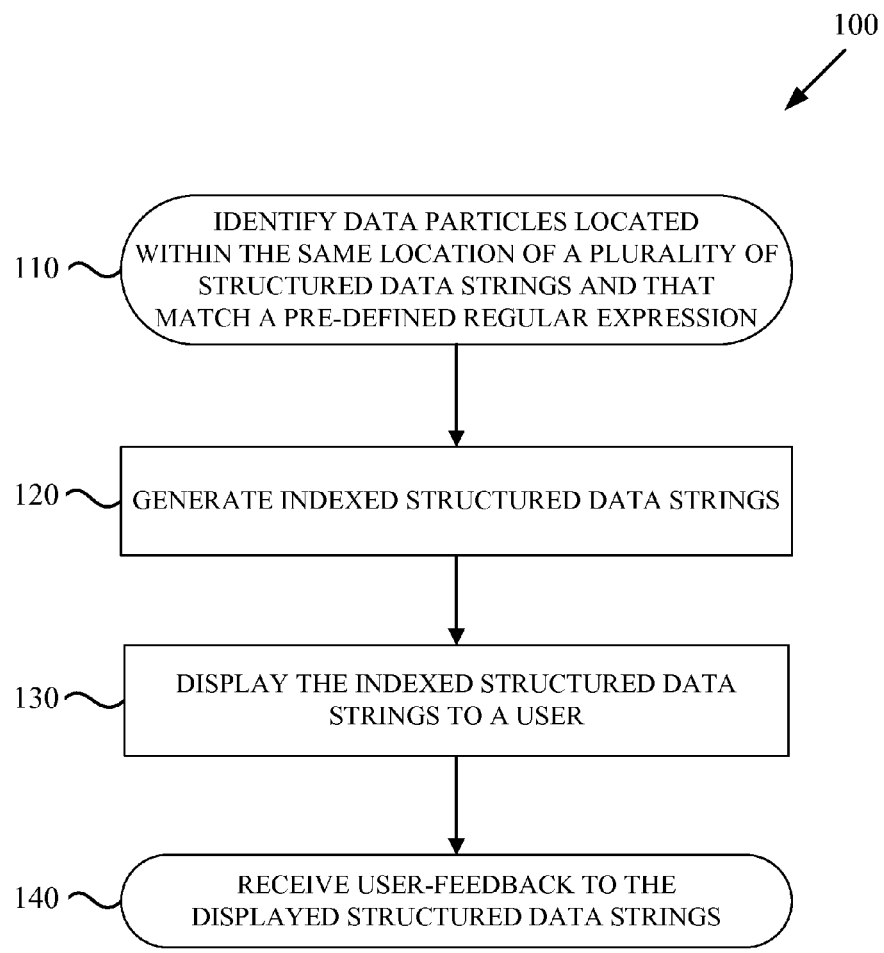
FIG. 2 shows a flowchart of an embodiment of a method in accordance with the Data Querying Method Using Indexed Structured Data Strings.

Referring now to FIG. 2, FIG. 2 shows a flowchart of an embodiment of a method 100 in accordance with the Data Querying Method Using Indexed Structured Data Strings. Some or all of the steps of method 100 may be stored on a non-transitory computer readable storage medium, wherein the steps are represented by computer-readable programming code. The steps of method 100 may also be computer-implemented using a programmable device, such as a computer-based system. Method 100 may comprise instructions that, when loaded into a computer-based system, cause the system to execute the steps of method 100. Method 100 may be computer-implemented using various programming languages, such as "Java", "C", or "C++". As an example, method 100 may be implemented on a system such as system 200 shown in FIG. 3. Further, method 100 may be implemented into a GUI such as GUI 10 shown in FIG. 1. For illustrative purposes, method 10 will be discussed with reference to GUI 10.

Method 100 may begin at step 110, which involves identifying, within each of a plurality of structured data strings within a data file having a serialized data format, one or more data items (i.e. "5.3", "5.0", "5.8" and "Oct. 26, 2010", "Oct. 27, 2010", "Oct. 27, 2010") located within substantially the same location within each structured data string and that match a pre-defined regular expression (i.e. decimal, date). For example, step 110, involves locating the bracketed data items displayed in textbox 50. Each of the plurality of data strings are contained within a data set (displayed in textbox 50) of a data field ("Title" in textbox 40) within the data file (selected in textbox 30 in FIG. 1). In some embodiments, the serialized data format is a text-based format. Step 110 may be performed by processor 210.

Next, step 120 involves generating a plurality of indexed structured data strings 52 by creating, within each of the plurality of structured data strings, a separate index (i.e. indexes 1 and 2) across all of the plurality of structured data strings for each identified data item matching a particular pre-defined regular expression (i.e. data particles "5.3", "5.0", "5.8" and data items "Oct. 26, 2010", "Oct. 27, 2010", "Oct. 27, 2010"). Step 120 may be performed by processor 220.

Method 100 may then proceed to step 130, which involves displaying the plurality of indexed structured data strings 52 to a user on a display. Step 130 may be performed by processor 220 in connection with display 240. As shown in FIG. 1, indexed structured data strings 52 are displayed in textbox 50. A user then may provide user feedback to the displayed plurality of indexed structured data strings at step 140. The user feedback may be provided via input device 230, which may be a mouse, keyboard, touch-screen, or other input device. In some embodiments, the user feedback is a query of each of the data sets based upon a user-selected index of the plurality of indexed structured data strings. In some embodiments, the user feedback is a designation of a structured data string index as a new data field of the data file. For example, the user may select the "Add as New Field" button 62 to pop-up second window 70, then title the new field by typing into textbox 80 and selecting submit button 90. In some embodiments, the user feedback may be stored within data storage 210 for future processing.

Figure 3:
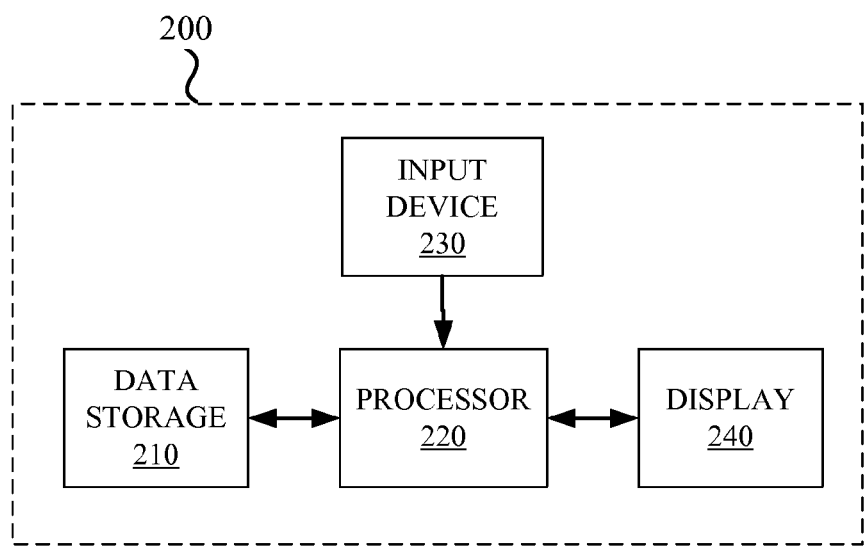
FIG. 3 shows a block diagram of an embodiment of a system that may be used to implement a method in accordance with the Data Querying Method Using Indexed Structured Data Strings.

Referring to FIG. 3, system 200 includes a data storage 210, a processor 220 operatively connected to data storage 210, an input device 230 operatively connected to processor 220, and a display 240 operatively connected to processor 220. Data storage 210 may have a relational database design and is configured to store multiple types of received data in a normalized format. As an example, data storage 210 may be configured to store received data as string data, integer data, decimal data, geographic data, date data, and/or binary data. Data storage 210 may have the data files stored therein.

In operation, a user of system 200 may utilize input device 230, such as a mouse or keyboard, to input a query into system 200. Processor 220 may then execute computer-implementable instructions stored therein, or in data storage 210, and cause queried data to be displayed to a user on display 240.

System 200 may be configured with the appropriate software modules to perform method 100 as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof.

Method 100 may be implemented as a series of modules, either functioning alone or in concert with physical electronic and computer hardware devices. Such modules may be utilized separately and/or together locally and/or remotely to form a program product thereof, that may be implemented through recordable media. Method 100 may be implemented as a program product comprised of a plurality of such modules, which can be interactively displayed for a user on a display, such as display 240. Such interactivity may be provided by a specialized GUI, such as GUI 10 shown in FIG. 1.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Data Querying Method Using Indexed Structured Data Strings are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A computer-implemented method comprising the steps of:
   identifying, within each of a plurality of structured data strings within a data file having a serialized data format, each of the plurality of structured data strings contained within a data set of a data field within the data file, one or more data items located within the same location within each structured data string and that match a pre-defined regular expression;
   generating a plurality of indexed structured data strings by creating, within each of the plurality of structured data strings, a separate index across all of the plurality of structured data strings for each identified data item matching a particular pre-defined regular expression by assigning an index designation adjacent to each identified data item matching the particular pre-defined regular expression;
   displaying the plurality of indexed structured data strings to a user; and
   receiving user-feedback to the displayed plurality of indexed structured data strings.

2. The computer-implemented method of claim 1, wherein the user-feedback is a query of each of the data sets based upon a user-selected index of the plurality of indexed structured data strings.

3. The computer-implemented method of claim 1, wherein the user-feedback is a designation of a structured data string index as a new data field of the data file.

4. The computer-implemented method of claim 1, wherein the pre-defined regular expressions are selected from the group of regular expressions consisting of decimal expressions, integer expressions, date expressions, geo-coordinate expressions, and binary expressions.

5. The computer-implemented method of claim 1, wherein the serialized data format is a text-based format.

6. The computer-implemented method of claim 1, wherein the index designation is selected from the group consisting of a numerical designation, an alphabetic designation, and an alpha-numeric designation.

7. The computer-implemented method of claim 1 further comprising the step of, prior to the step of displaying the plurality of indexed structured data strings to a user, surrounding each identified data item matching the particular pre-defined regular expression with brackets, wherein the index designation is assigned adjacent to the identified data item outside of the brackets.

8. A non-transitory computer-readable storage medium having a method encoded thereon, the method represented by computer-readable programming code, the method comprising the steps of:
   identifying, within each of a plurality of structured data strings within a data file having a serialized data format, each of the plurality of structured data strings contained within a data set of a data field within the data file, one or more data items located within the same location within each structured data string and that match a pre-defined regular expression;
   generating a plurality of indexed structured data strings by creating, within each of the plurality of structured data strings, a separate index across all of the plurality of structured data strings for each identified data item matching a particular pre-defined regular expression by assigning an index designation adjacent to each identified data item matching the particular pre-defined regular expression;
   displaying the plurality of indexed structured data strings to a user; and
   receiving user-feedback to the displayed plurality of indexed structured data strings.

9. The non-transitory computer-readable storage medium of claim 8, wherein the user-feedback is a query of each of the data sets based upon a user-selected index of the plurality of indexed structured data strings.

10. The non-transitory computer-readable storage medium of claim 8, wherein the user-feedback is a designation of a structured data string index as a new data field of the data file.

11. The non-transitory computer-readable storage medium of claim 8, wherein the pre-defined regular expressions are selected from the group of regular expressions consisting of decimal expressions, integer expressions, date expressions, geo-coordinate expressions, and binary expressions.

12. A system comprising:
a data storage;
a processor operatively connected to the data storage;
a display operatively connected to the processor; and
an input device operatively connected to the processor
wherein the processor has computer-implementable instructions stored therein, the instructions comprising:
identifying, within each of a plurality of structured data strings within a data file stored within the data storage, each of the plurality of structured data strings contained within a data set of a data field within the data file, one or more data items located within the same location within each structured data string and that match a pre-defined regular expression,
generating a plurality of indexed structured data strings by creating, within each of the plurality of structured data strings, a separate index across all of the plurality of structured data strings for each identified data item matching a particular pre-defined regular expression by assigning an index designation adjacent to each identified data item matching the particular pre-defined regular expression,
displaying the plurality of indexed structured data strings on the display, and
receiving, via the input device, user-feedback to the displayed plurality of indexed structured data strings.

13. The system of claim 12, wherein the user-feedback is a query of each of the data sets based upon a user-selected index of the plurality of indexed structured data strings.

14. The system of claim 12, wherein the user-feedback is a designation of a structured data string index as a new data field of the data file.

15. The system of claim 12, wherein the pre-defined regular expressions are selected from the group of regular expressions consisting of decimal expressions, integer expressions, date expressions, geo-coordinate expressions, binary expressions, and string expressions.

16. The system of claim 12, wherein the data file has a text-based serialized data format.

* * * * *